United States Patent
Yamada

(10) Patent No.: US 6,437,923 B1
(45) Date of Patent: Aug. 20, 2002

(54) HIGH ZOOM RATIO LENS

(75) Inventor: Yasuharu Yamada, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 09/895,066

(22) Filed: Jul. 2, 2001

(30) Foreign Application Priority Data

Feb. 9, 2001 (JP) ...................................... 2001-034421

(51) Int. Cl.$^7$ .............................................. G02B 15/14
(52) U.S. Cl. ...................................... 359/687; 359/684
(58) Field of Search .............................. 359/684, 687, 359/686, 685

(56) References Cited

U.S. PATENT DOCUMENTS

| | | | |
|---|---|---|---|
| 4,629,294 A | 12/1986 | Tanaka et al. | |
| 4,770,511 A | 9/1988 | Yonezawa et al. | |
| 5,528,423 A | 6/1996 | Arimoto et al. | |
| 5,557,470 A | 9/1996 | Shibayama | |
| 5,694,253 A | 12/1997 | Shibayama | |
| 5,699,198 A | 12/1997 | Inadome et al. | |
| 5,734,508 A | 3/1998 | Sato | |
| 5,859,729 A | 1/1999 | Misaka | |
| 6,353,505 B1 * | 3/2002 | Yoneyama | 359/687 |

FOREIGN PATENT DOCUMENTS

| | | |
|---|---|---|
| JP | H8-86963 | 4/1996 |
| JP | H8-211290 | 8/1996 |
| JP | H8-234108 | 8/1996 |
| JP | H9-005629 | 10/1997 |
| JP | 2000-89117 | 3/2000 |

* cited by examiner

*Primary Examiner*—Hung Xuan Dang
(74) *Attorney, Agent, or Firm*—Jacobson Holman, PLLC

(57) ABSTRACT

The present invention is directed to a compact and light-weight high magnification zoom lens utilizing a 4-element zoom layout of positive, negative, positive, and positive in refractive property, which is approximately 75 degrees in shooting angle of view at a wide-angle end, approximately F/3 to F/4 in F-number at the wide end, approximately F/5 to F/6 at a tele end, and approximately 6 to 7 in zoom ratio. The zoom lens includes first to fourth elements each comprised of a plurality of lenses, and the elements have respective refractive powers of positive, negative, positive, and positive levels in order from the closest to a subject. Only the second element of lenses is moved for focusing while the conditions described as follows are satisfied:

$$0.065 < \phi T / |\phi 2| < 0.085 \quad (1)$$

$$0.35 < \phi T / |\phi 1| < 0.55 \quad (2)$$

$$0.25 < \phi T / \phi 4 < 0.35 \quad (3)$$

$$0.75 < |\beta 2T| < 0.95 \quad (4)$$

5 Claims, 4 Drawing Sheets

HIGH ZOOM RATIO LENS

BACKGROUND OF THE INVENTION

1. Field of the Invention

The present invention relates to a high magnification zoom lens, and more particularly, it relates to a compact lightweight zoom lens that is approximately 75 degrees in shooting angle of view at a wide end, approximately F/3 to F/4 in F-number at the wide end, approximately F/5 to F/6 at a tele end, and approximately 6 to 7 in zoom ratio, and that is suitable for a single-lens reflex camera, a video camera, an electronic still camera, and the like,

2. Prior Art

In the prior art, there have been proposed a variety of zoom lenses such as high zoom ratio 4, 5 and 6-element lenses. However, such highly multi-element lenses are advantageous in view of correcting aberrations, but they tend to lead to an adverse effect of cost increase due to an increased number of components including a cam barrel. The whole lenses also tend to disadvantageously be larger. Instead, a reduced-element lens such as a 2-element lens encounters a difficulty in attaining both enhancing a zoom ratio and down-sizing because of its inherent lens property.

As to an improvement of a high zoom ratio lens in emphatically down-sized and weight-reduced design, a 4-element zoom lens is suitably implemented, with four of the elements having their respective refractive indices of positive, negative, positive, and positive levels in order from the closest to a subject, which is equivalent to those disclosed in Japanese Patent Laid-Open No. H8-211290 and Japanese Patent Laid-Open No. H9-5629, and is also equivalent to a product, Zoom Lens 71D (18 to 200 mm in focal length and F/3.8 to F/5.6 in F-number) available from TAMRON Incorporated.

Although a trend of down-sizing the high zoom ratio lenses has been drastic and rapid in recent years, improvements in the prior art are still yet bulky and heavy for practical use, compared with ordinary standard zoom lenses of approximately 28 to 105 mm in focal length and rough1 y F/3.5 to F/4.5 in F-number. In addition to that, insufficiently reduced dimensions of the prior art high zoom ratio lenses cause not only imbalance with more greatly down-sized and weight-reduced bodies of single-lens reflex cameras but also poor portability.

One of factors of the high zoom ratio lenses'staying larger than the standard zoom lenses is that a displacement of each of the elements comprised of a plurality of lenses is increased to attain a higher zoom ratio, and a subsequent variation in aberration is also increased, which, in turn, causes a difficulty in correcting the aberration in any point of focal range. To overcome such a disadvantage, several approaches have been attempted, including ways of reducing a refractive power of each element comprised of lenses to correct aberration, increasing the number of lenses in each element to correct aberration without reducing the refractive power of the element, configuring aspheric surface to correct aberration, and so forth.

However, the ways other than that using an aspheric geometry unavoidably make the whole lens dimensions larger. As with the way of using the aspheric geometry, however, simply increasing the number of surfaces causes further problems of a performance reduction due to a poor surface precision and of an increase in cost for a metal mold. For instance, the previously mentioned Zoom Lens 71D is comprised of 16 pieces of lenses, creating 2 of the aspheric surfaces, and this model is 81.5 mm in full lens length at a wide end and ϕ72 mm in filter diameter, being 6 mm or more larger in full length and 10 mm or more greater in filter diameter than the above mentioned standard zoom lenses.

The zoom lenses as disclosed in Japanese Patent Laid-Open Nos. H8-211290 and H9-5629 are, when compared with the model 71D, almost the same in effective diameter of a front lens although having some variation in full lens length at a wide end, and thus, similar to the model 71D, these lenses cannot be categorized in the standard zoom lenses because of their insufficiently reduced dimensions.

The present invention is made, allowing for the above mentioned disadvantages in the prior art high zoom ratio lenses, and accordingly, it is an object of the present invention to provide a compact and lightweight high zoom ratio lens which is configured in 4-element zoom format with a deployment of positive, negative, positive, and positive lens elements in order, being approximately 75 degree in shooting angle of view at a wide end, approximately F/3 to F/4 in F-number at the wide end, and approximately F/5 to F/6 in F-number at a tele end so as to implement an enhanced high zoom ratio of approximately 6 to 7 and which is yet as large as standard zoom lenses (classified in those which are 28 to 105 mm in focal length and F/3.5 to F/4.5 in F-number).

SUMMARY OF THE INVENTION

A zoom lens according to the present invention includes first to fourth elements each comprised of a plurality of lenses, the elements having respective refractive indices of positive, negative, positive, and positive levels in order from the closest to a subject. In zooming from a wide-angle end to a telephoto end, the first and second elements of lenses have a space (air) enlarged therebetween, the second and third elements of lenses have a space (air) narrowed therebetween, and the third and fourth elements of lenses have space (air-filled) narrowed therebetween while the first, third, and fourth elements of lenses move toward the subject, and the second element of lenses reciprocally moves along an optical axis. In such a zoom lens, only the second element of lenses is moved for focusing while the conditions described as follows are satisfied:

$$0.065 < \phi T / |\phi 2| < 0.085 \quad (1)$$

$$0.35 < \phi T / \phi 1 < 0.55 \quad (2)$$

$$0.25 < \phi T / \phi 4 < 0.35 \quad (3)$$

$$0.75 < |\beta 2T| 0.95 \quad (4)$$

where ϕT is a refractive power of the whole system at the telephoto end, ϕ2 is a refractive power of the second element of lenses, ϕ1 is a refractive power of the first element of lenses, ϕ4 is a refractive power of the fourth element of lenses, and β2T is an imaging power of the second element of lenses at the telephoto end (β2T<0).

The best mode of the present invention includes embodiments as described below.

The lenses of the third element are an aperture stop, a dual-sided convex positive lens, a positive meniscus lens having a convex surface faced toward the subject, and a negative lens which are all deployed in order from the closest to the subject, and the aperture stop is moved for zooming along with other lenses. The dual-sided convex positive lens has its one side configured in aspheric surface facing toward the subject, and such an aspheric geometry gives a property that any point in the edges farther from the center of the lens becomes greater in positive refractive power.

Additionally, the zoom lens according to the present invention satisfies the following condition:

$$-0.05 < 1/\beta 3w < 0 < 1/\beta 3T < 0.30 \quad (5)$$

where β3w is an imaging power of the third element of lenses at the wide-angle end, and β3T is an imaging power of the third element of lenses at the telephoto end.

Moreover, the zoom lens according to the present invention satisfies the following condition:

$$DWENP < 28 \quad (6)$$

where DWENP is a distance from an apex of one side of the first element of lenses facing toward the subject at the wide-angle end to the center of an entrance pupil.

Furthermore, the zoom lens according to the present invention satisfies the conditions as follows:

$$0.22 < |\beta 2W| < 0.3 \quad (7)$$

$$e0 < 5 \quad (8)$$

$$h1 + e0 \times \tan \alpha W + fW/(2 \times FW) < 25 \quad (9)$$

where β2W is an imaging power of the second element of lenses at the wide-angle end (β2W<0), e0 is a distance from the apex of one side of the first element of lenses facing toward the subject to a front principal point of the first element, h1 is a level at which extensions of principal rays incident at a half-angle of view come across a frontal principal plane of the first element of lenses at the wide end, which is expressed by an equation of computation in relation with paraxial rays, as follows:

$$h1 = e1 \times e2 \times \tan \alpha W \times (1/e1 + 1/e2 - \phi 2)/((1 - e1 \times \phi 1) \times (1 - e2 \times \phi 2) - e2 \times \phi 1)$$

where e1 is a distance between primary points of the first and second elements of lenses, which is expressed by an equation $$e1 = (\phi 1 \times \phi 2 - \phi 1/\beta 2W)/(\phi 1 \times \phi 2),$$

and e2 is a distance between primary points of the second element of lenses and aperture stop, which is expressed by an equation $$e2 = (1 - hSTP \times FW/fW - \phi 1 \times e1) \times \beta 2W/\phi 1$$

where hSTP is an open radius of the aperture stop, αW is a half-angle of view at the wide-angle end, fW is a focal length of the whole system at the wide end, and FW is a F-number at the wide end.

BRIEF DESCRIPTION OF THE DRAWINGS

Preferred embodiments of the present invention will now be described in detail, and they will be understood best when taken in conjunction with the accompanying drawings, wherein.

DETAILED DESCRIPTION OF THE BEST MODE OF THE INVENTION

Figure 1:
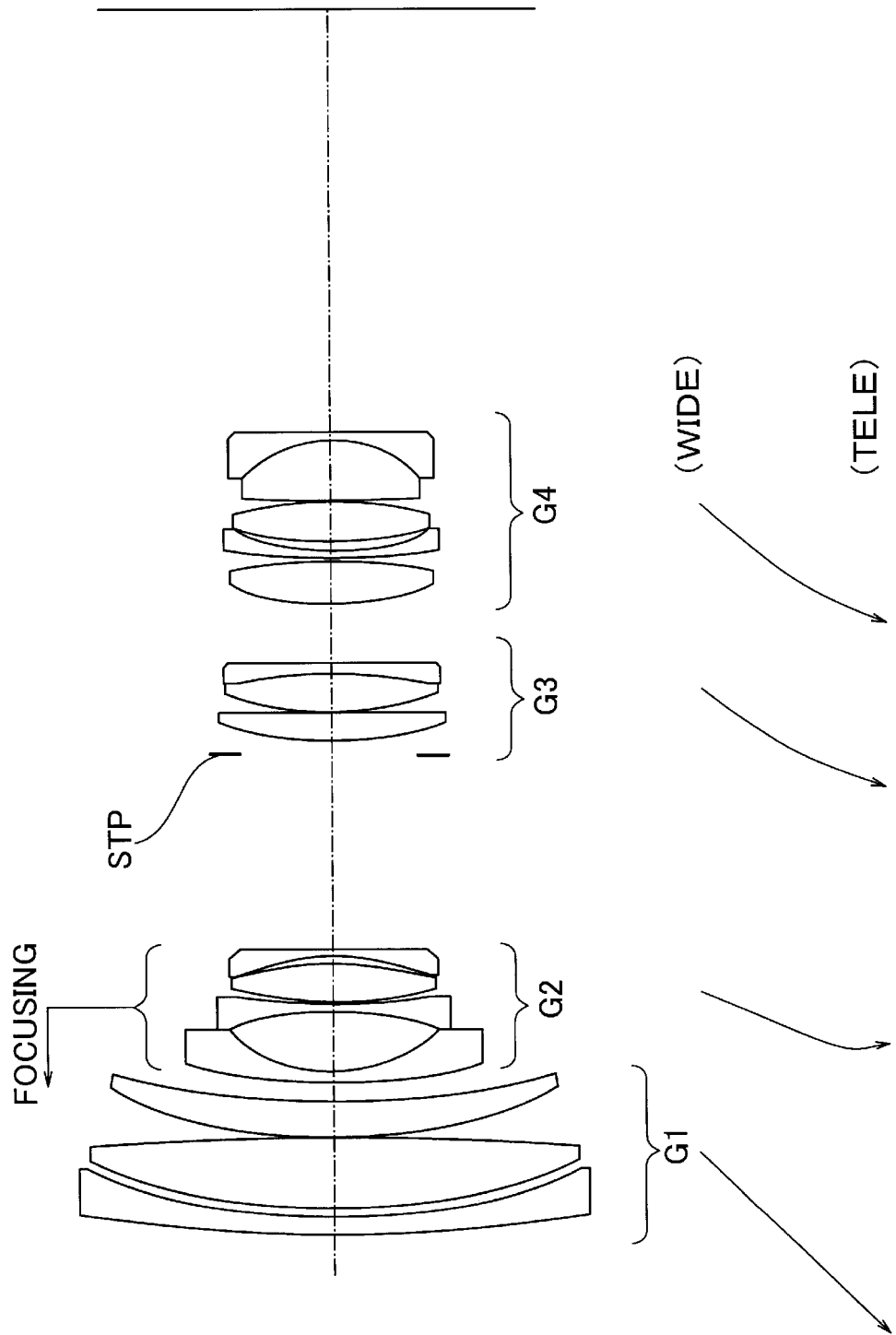
FIG. 1 is a diagram showing an optical configuration of an exemplary zoom lens according to the present invention.
Figure 2:
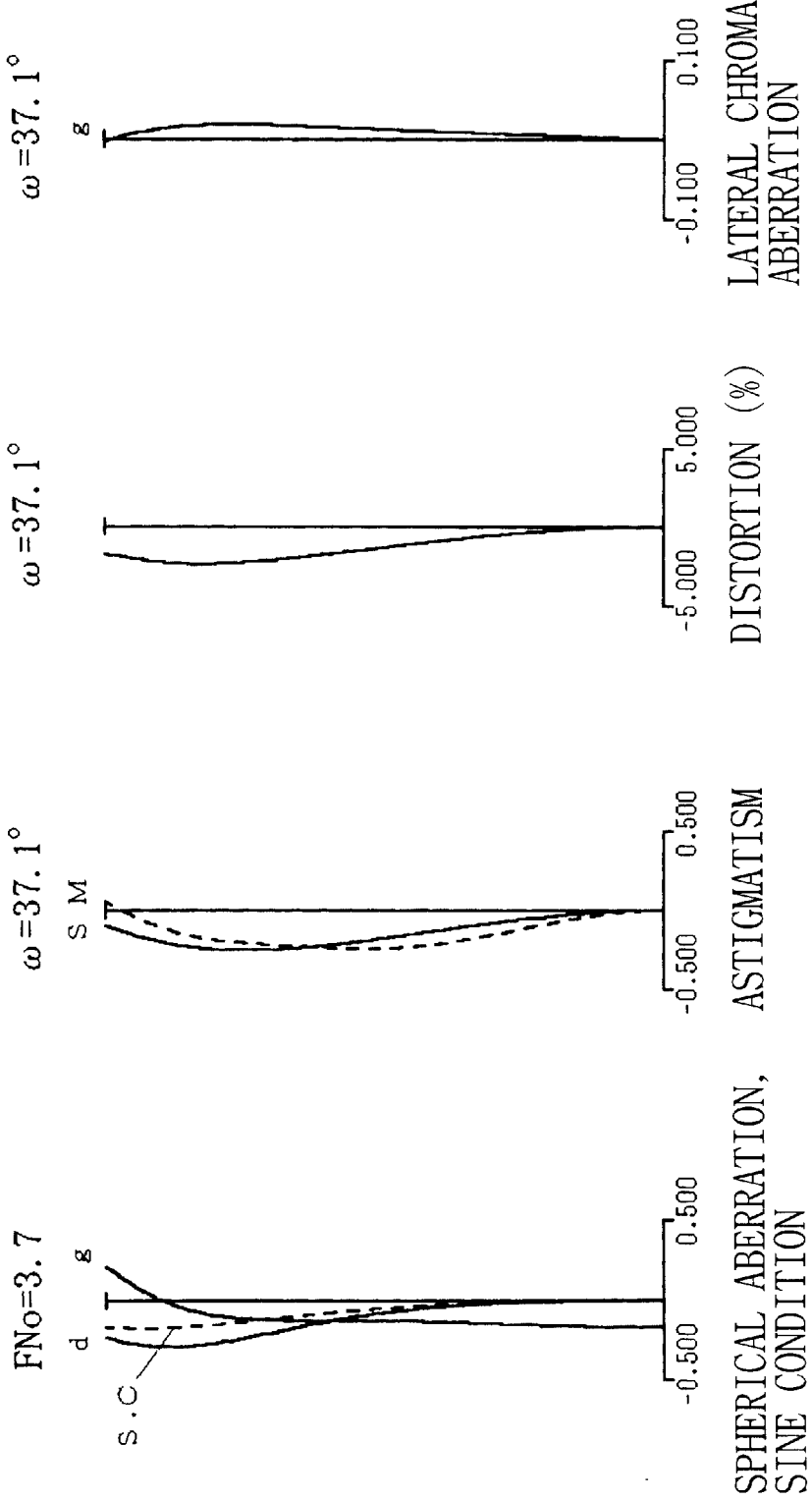
FIG. 2 illustrates graphs of various aberration patterns at a wide-angle end in the zoom lens of FIG. 1.
Figure 3:
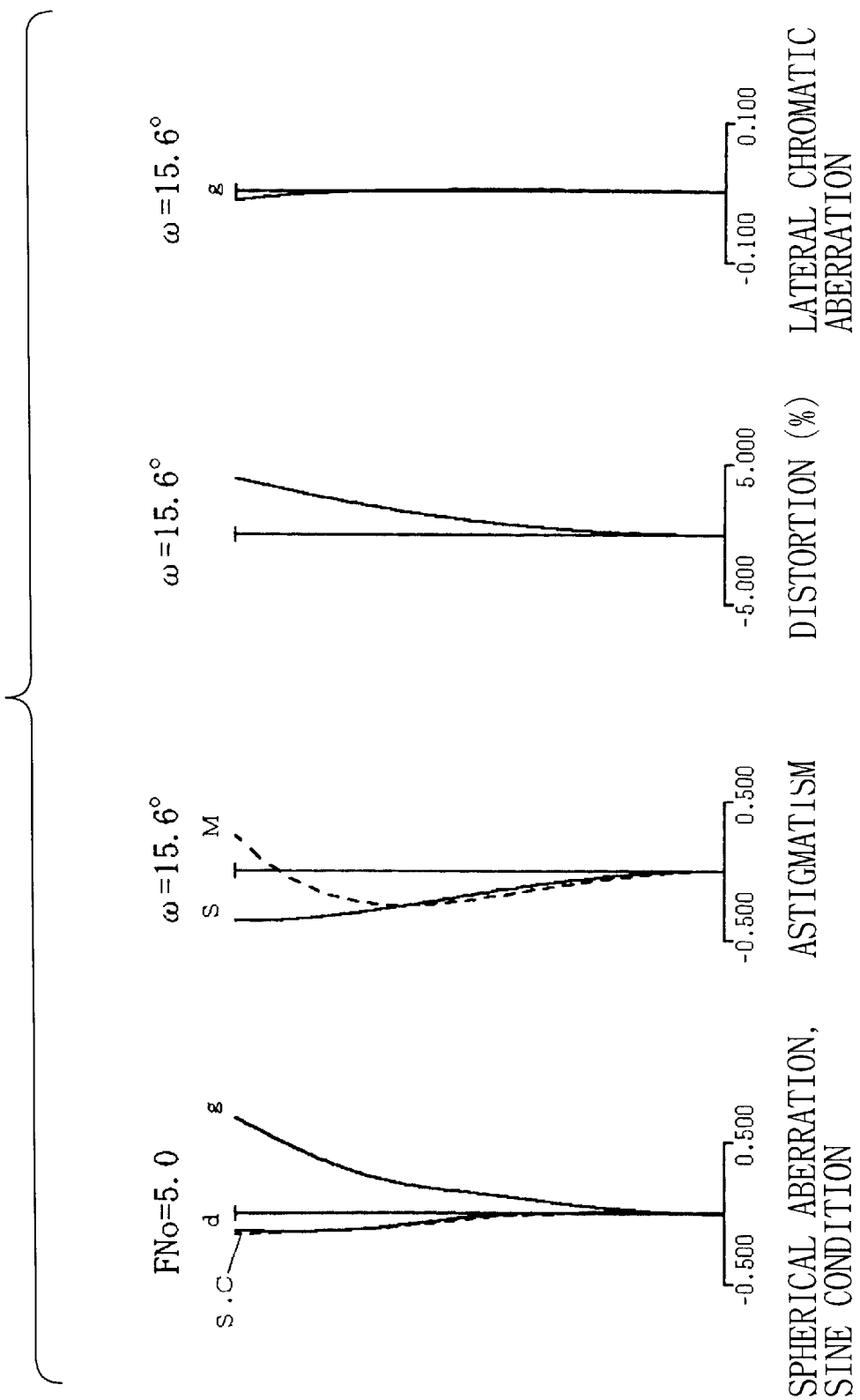
FIG. 3 illustrates graphs of various aberration patterns at an intermediate focal length in the zoom lens of FIG. 1.
Figure 4:
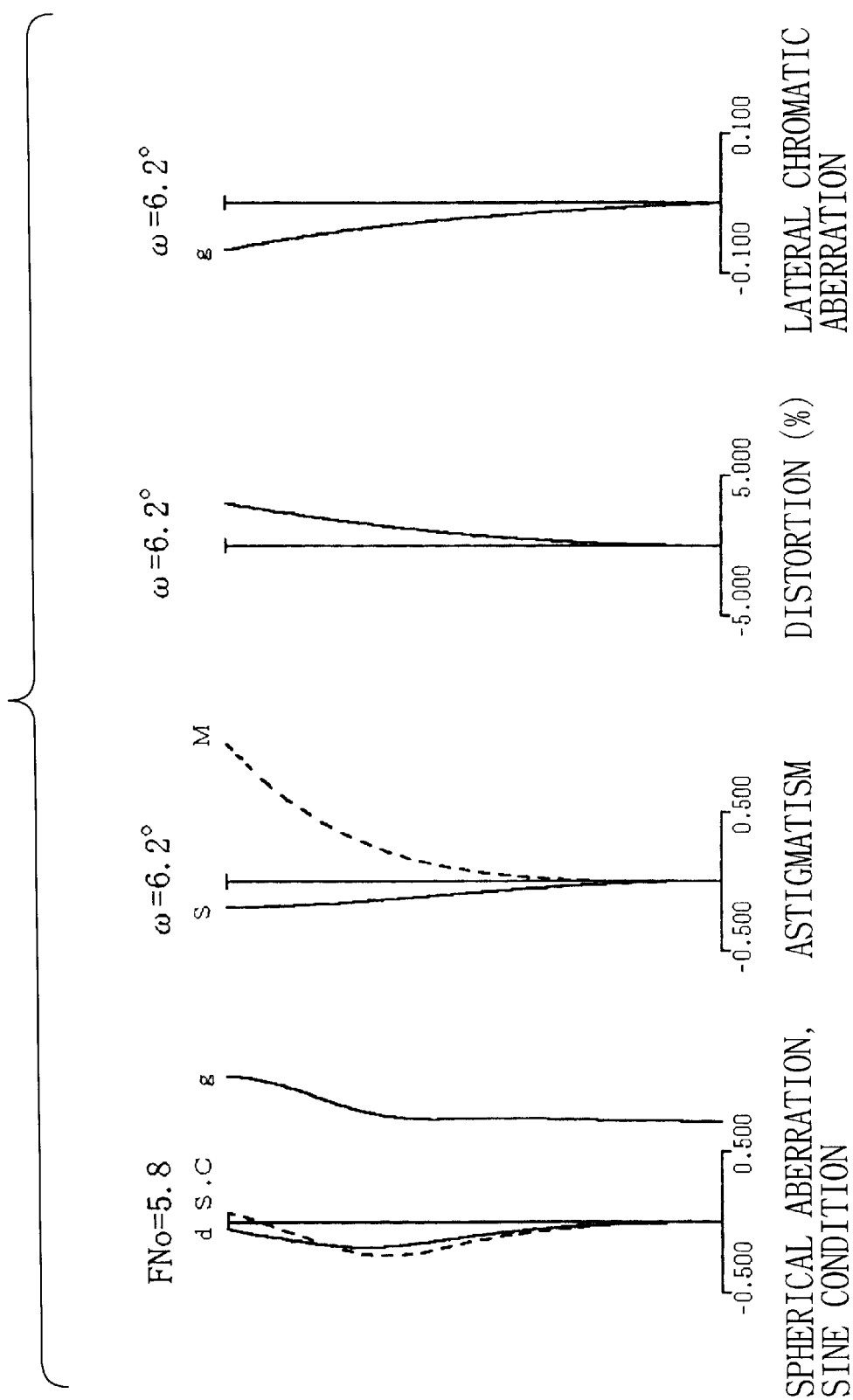
FIG. 4 illustrates graphs of various aberration patterns at a telephoto end in the zoom lens of FIG. 1.

All the formulas of the same number designate identical ones throughout this specification.

In an aspect of the present invention as defined in Claim 1 in the appended claims, the zoom lens utilizes an inner focusing method in which only the second element of lenses is moved for focusing. The method is defective in that a focal length associated with the focusing is varied in a considerably wide range whereas it is practically advantageous for down-sizing in that there is no necessity of moving large heavy lenses as in the first element, which partially eliminates a necessity of actuating a motor to drive the lenses during auto-focusing to permit a quick focal adjustment and also in that an effective diameter of a front lens can be kept relatively small during shooting a subject in a zoom-in mode.

The formula (1) defines a rate of the refractive power φT of the whole system with the refractive power φ2 of the second element of lenses at the telephoto end of the zoom lens. Beyond an upper limit as defined in the formula (1), the refractive power of the second element of lenses is diminished, and this causes displacements of the lenses to increase during zooming to such an extent as being an obstacle to down-sizing. Below a lower limit defined in the formula (1), the refractive power of the second element of lenses is multiplied to such an extent as leading to a difficulty in correcting aberration.

The formula (2) defines a rate of the refractive power φT of the whole system with the refractive power φ1 at the telephoto end of the zoom lens. Above an upper limit as defined in the formula (2), the refractive power of the first element of lenses is diminished to such an extent as being effective in correcting various aberrations but adversely increases displacements of the lenses during zooming to lead to a necessity of having the extended whole length of the lenses. Below a lower limit defined in the formula (2), the refractive power of the first element of lenses is intensified to such an extent as causing a difficulty in correcting various aberrations.

The formula (3) defines a rate of the refractive power φT of the whole system with the refractive power φ4 of the fourth element of lenses at the telephoto end of the zoom lens. Above an upper limit as defined in the formula (3), the refractive power of the fourth element of lenses is diminished to such an extent as being effective in correcting various aberrations, but adversely extends a back focus to consequently lead to a necessity of having the extended whole length of the lenses to such an extent as being an obstacle to down-sizing. Below a lower limit defined in the formula (3), the refractive power of the fourth element of lenses is increased to such an extent as having a shortened back focus to encounter a difficulty in ensuring a mirror drive region in a single-lens reflex camera. This also leads to another difficulty in correcting various aberrations.

The formula (4) defines an imaging power of the second element of lenses at the tele end. Above an upper limit as defined in the formula (4), a displacement of the second element of lenses is increased during focusing, and resultantly, an increased variation in aberration is caused during the focusing at the telephoto end. Below a lower limit defined in the formula (4), paraxial rays incident from the second element of lenses upon the third element of lenses make larger angles at the telephoto end, and therefore, an increased variation in spherical aberration is caused in the third element of lenses during the focusing to such an extent as encountering a difficulty in correcting the aberration. In an alternative concept, the incident angles can be reduced by diminishing the refractive power of the second element of lenses, but this also results in a displacement of the second element of lenses increasing during zooming to such an extent as being an obstacle to down-sizing.

The high zoom ratio lens as defined in Claim 1 is desirably modified by meeting at least one of requirements defined in Claims 2 to 5, so as to effectively correct variations in aberration during zooming in and out, and to implement a down-sized and weight-reduced design as compact and lightweight as standard zoom lenses (approximately 28 to 105 mm in focal length and roughly F/3.5 to F/4.5 in F-number).

In another aspect of the present invention as defined in Claim 2, the third element of lenses consists of an aperture stop, a dual-sided convex positive lens, a positive meniscus lens having its convex side faced toward a subject, and a negative lens, and the aperture stop moves along with other lenses during zooming to correct various aberrations well and to reduce the number of components such as a cam barrel, which is advantageous for down-sizing. Also, since the zoom lens according to the present invention restricts an effective diameter of a front lens to a length smaller than those of the prior art high zoom ratio lenses, the stop residing right in front of the third element of lenses partially cut off rays in a zoom-in mode. To avoid such an effect of vignetting, the second element of lenses is floated toward the subject in a zoom range covering intermediate to telephoto regions where the vignetting is apt to occur. When the second element of lenses effecting a strong negative refractive power is moved toward the subject, however, spherical aberration is prone to be excessively corrected, and a lens performance is also considerably degraded. Thus, the third element of lenses has its one side closest to the subject configured in an aspheric geometry to have a positive refractive power more intensified as in any position closer to the lens edges, so as to properly correct the aberration.

In still another aspect of the present invention as defined in Claim 3, the formula (5) defines a relation of imaging ratios of the third element of lenses between the wide end and the tele end. Beyond upper and lower limits as defined in the formula (5), paraxial rays incident from the third element of lenses upon the fourth element of lenses make increased angles at the wide-angle end and the telephoto end, respectively, a variation in spherical aberration at the fourth element of lenses is increased to such an extent as disturbing a correction of the aberration. In an alternative design, the third element of lenses may have a reduced refractive power to make the incident angles smaller whereas a displacement of the third element of lenses is increased during zooming, which leads to an obstacle to down-sizing. Defining the imaging ratio of the third element of lenses as being more and less than zero level as can be seen in the formula (5), epaxial rays incident upon the fourth element of lenses are collimated in an approximately afocal manner through the entire extension of the zoom range, and hence, the variation in aspheric aberration can be reduced when the fourth element of lenses is moved in directions along the optical axis (i.e., in thrust directions).

In further another aspect of the present invention as defined in Claim 4, the formula (6) defines a distance from an apex of one side of the first element of lenses facing toward the subject to the center of an entrance pupil at the wide end. Above an upper limit of the formula (6), an effective diameter of a front lens as long as in the standard zoom lenses brings about insufficiency in luminous intensity near the edges of a field of view at the wide end. To overcome this disadvantage, a diameter of the stop and the effective diameter of the front lens must be made larger, and this results in another obstacle to down-sizing.

In yet another aspect of the present invention as defined in Claim 5, the formula (7) defines an imaging ratio of the second element of lenses at the wide-angle end. Beyond an upper limit as defined in the formula (7), a displacement of the second element of lenses is increased during focusing at the wide-angle end, and consequently, an idle space defined together with the first element of lenses is to be cut off in a zoom-in mode, that is, the space can hardly become longer than a feed pitch of the second element of lenses. Although one approach to avoid such a difficulty is enlarging a space (air-filled) between the first and second elements of lenses, this resultantly causes increases in the whole length of the lenses and the effective diameter of the front lens, and such a result also causes an adverse effect against down-sizing. Beyond a lower limit defined in the formula (7), since paraxial rays incident from the second element of lenses upon the third element of lenses make increased angles at the wide end, a variation in spherical aberration at the third element of lenses is increased during focusing, and this also results in a difficulty in correcting the aberration.

The formula (8) defines a distance from an apex of one side of the first element of lenses facing toward the subject to a front principal point of the first element of lenses. Beyond an upper limit as defined in the formula (8), rays in relation with the edges of the field of view are passed apart from a central spot of the stop at the wide-angle end and are partially cut off with a minimal shutter aperture. Thus, it is necessary diminishing the refractive power of the first element of lenses and/or intensifying the refractive power of the second element of lenses to reduce a distance between principal points of the first and second elements of lenses, so that a front lens diameter as large as those in the standard zoom lenses may not be a cause of obstruction of the rays, or vignetting, and instead may make the rays pass through the central spot of the stop. In either way, it is hard to obtain paraxial rays which can bring about an enhanced performance desired in the present invention while pursuing a sufficiently compact and intensified zoom ratio lens design.

The formula (9) defines a maximum distance from the optical axis in planes tangent to an apex of one side of the first element of lenses facing toward the subject within which the rays in relation with the edges of the field of view can be passed without obstruction or vignetting at the wide-angle end (an effective radius of a front lens at the wide-angle end that is calculated based upon paraxial rays). Beyond an upper limit of the formula (9), the effective diameter of the front lens is increased to such an extent as encountering a difficulty in implementing a high zoom ratio lens as compact and lightweight as those in the standard zoom lenses as desired in the present invention.

PREFERRED EMBODIMENTS

Preferred embodiments of the high zoom ratio lens according to the present invention will now be described in more detail. Among items listed in the following table, numbers with asterisk * denote aspheric surfaces. Although an equation expressing an aspheric geometry is shown below, H is a height perpendicular to the optical axis, X(H) is a variation in the height H in directions along the optical axis with an origin of an apex in the aspheric geometry, R is a paraxial radius of curvature, $\epsilon$ is a constant of the cone, An is a coefficient of the aspheric surface in elation with an exponent n:

$$X(H)=(H^2/R)[1+\{1-(1+\epsilon)*(H^2/R^2)\}^{1/2}]+A_4H^4+A_6H^6+A_8H^8+A_{10}H^{10} \qquad (10)$$

TABLE 1

Focal length: f mm = 29.07 through 74.76 to 193.0
F-number: F3.69 through F5.03 to F5.82

| # | r | d | n | v |
|---|---|---|---|---|
| 1 | 179.53 | 1.5 | 1.84666 | 23.8 |
| 2 | 61.30 | 1.0 | | |
| 3 | 61.62 | 6.5 | 1.69680 | 55.5 |
| 4 | −426.53 | 0.2 | | |
| 5 | 48.45 | 3.8 | 1.77250 | 49.6 |
| 6 | 99.01 | d6 = 1.768 thru 23.261 to 42.131 | | |
| *7 | 67.95 | 0.2 | 1.53610 | 41.2 |
| 8 | 55.55 | 0.8 | 1.83481 | 42.7 |
| 9 | 14.26 | 5.8 | | |
| 10 | −35.32 | 0.9 | 1.72000 | 50.2 |
| 11 | 58.73 | 0.1 | | |
| 12 | 30.04 | 3.8 | 1.84666 | 23.8 |
| 13 | −36.56 | 0.7 | | |
| 14 | −23.34 | 0.8 | 1.83481 | 42.7 |
| 15 | −643.51 | d15 = 19.553 thru 10.101 to 0.969 | | |
| 16 | ∞ (stop) | 0.9 | | |
| *17 | 34.75 | 0.2 | 1.53610 | 41.2 |
| 18 | 34.75 | 2.6 | 1.79952 | 42.2 |
| 19 | −2289.84 | 0.1 | | |
| 20 | 26.02 | 2.5 | 1.72000 | 50.2 |
| 21 | 157.33 | 1.4 | | |
| 22 | −38.27 | 0.8 | 1.84666 | 23.8 |
| 23 | 173.64 | d23 = 5.785 thru 3.360 to 1.913 | | |
| 24 | 23.69 | 4.3 | 1.51633 | 64.1 |
| 25 | −59.67 | 0.2 | | |
| 26 | 58.16 | 0.8 | 1.80610 | 40.9 |
| 27 | 17.46 | 0.7 | | |
| 28 | 24.79 | 3.8 | 1.51823 | 59.0 |
| 29 | −36.01 | 0.2 | 1.53610 | 41.2 |
| *30 | −36.01 | 0.2 | | |
| 31 | 152.16 | 5.8 | 1.53610 | 48.9 |
| 32 | −10.20 | 0.8 | 1.77250 | 49.6 |
| 33 | 513.23 | | | |

COEFFICIENT OF ASPHERIC SURFACE r7
$\epsilon = 1.8366$
$A4 = 9.76517 \times 10^{-06}$
$A6 = 8.27233 \times 10^{-09}$
$A8 = 1.82191 \times 10^{-11}$
$A10 = 6.33815 \times 10^{-13}$ r17
$\epsilon = -0.1979$
$A4 = 3.72528 \times 10^{-06}$
$A6 = 3.39383 \times 10^{-08}$
$A8 = 1.62580 \times 10^{-11}$
$A10 = -1.73954 \times -10\ 12$ r30
$\epsilon = 1.3716$
$A4 = 6.11041 \times 10^{-07}$
$A6 = 1.08319 \times 10^{-07}$
$A8 = 2.76656 \times 10^{-10}$
$A10 = 1.51768 \times 10^{-11}$ In the above embodiments of the high zoom ratio lens according to the present invention, terms in the conditional inequalities (1) to (9) are expressed as follows:

$$i\ \phi T/|\phi 2| = 0.079 \tag{I}$$

$$\phi T/\phi 1 = 0.418 \tag{II}$$

$$\phi T/\phi 4 = 0.304 \tag{III}$$

$$|\beta 2T| = 0.895 \tag{IV}$$

$$1/\beta 3w = -0.010 \tag{V}$$

$$1/\beta 3T = 0.204 \tag{V}$$

$$DWENP = 27.01 \tag{VI}$$

$$|\beta 2W| = 0.265 \tag{VII}$$

$$e0 < 5 = 4.121 \tag{VIII}$$

$$h1 + e0 \times \tan \alpha W + fW/(2 \times FW) = 24.22 \tag{IX}$$

What is claimed is:

1. A high zoom ratio lens including first to fourth elements each comprised of a plurality of lenses, the elements having respective refractive indices of positive, negative, positive, and positive levels in order from the closest to a subject, in zooming from a wide-angle end to a telephoto end, the first and second elements of lenses having a space (air) enlarged therebetween, the second and third elements of lenses having a space (air) narrowed therebetween, and the third and fourth elements of lenses having space (air) narrowed therebetween while the first, third, and fourth elements of lenses move toward the subject, and the second element of lenses reciprocally moving along an optical axis, only the second element of lenses being moved for focusing while conditions described as follows are satisfied:

$$0.065 < \phi T/|\phi 2| < 0.085 \tag{1}$$

$$0.35 < \phi T/\phi 1 < 0.55 \tag{2}$$

$$0.25 < \phi T/\phi 4 < 0.35 \tag{3}$$

$$0.75 < |\beta 2T| < 0.95 \tag{4}$$

where $\phi T$ is a refractive power of the whole system at the telephoto end, $\phi 2$ is a refractive power of the second element of lenses, $\phi 1$ is a refractive power of the first element of lenses, $\phi 4$ is a refractive power of the fourth element of lenses, and $\beta 2T$ is an imaging power of the second element of lenses at the tele end ($\beta 2T < 0$).

2. A high zoom ratio lens according to claim 1, wherein the lenses of the third element consists of an aperture stop, a dual-sided convex positive lens, a positive meniscus lens having a convex surface faced toward the subject, and a negative lens which are all deployed in order from the closest to the subject, the aperture stop being moved for zooming along with other lenses, the dual-sided convex positive lens having its one side configured in aspheric surface facing toward the subject, so that such an aspheric geometry gives a property that any point in the edges farther from the center of the lens becomes greater in positive refractive power.

3. A high zoom ratio lens according to claim 1, wherein the zoom lens satisfies a condition as follows;

$$-0.05 < 1/\beta 3w < 0 < 1/\beta 3T < 0.30 \tag{5}$$

where $\beta 3w$ is an imaging power of the third element of lenses at the wide end, and $\beta 3T$ is an imaging power of the third element of lenses at the telephoto end.

4. A high zoom ratio lens according to claim 1, wherein the zoom lens satisfies a condition as follows;

$$DWENP<28 \qquad (6)$$

where DWENP is a distance from an apex of one side of the first element of lenses facing toward the subject at the wide end to the center of an entrance pupil.

5. A high zoom ratio lens according to claim 1, wherein the zoom lens satisfies conditions as follows;

$$0.22<|\beta 2W|<0.3 \qquad (7)$$

$$e0<5 \qquad (8)$$

$$h1+e0\times\tan \alpha W+fW/(2\times FW)<25 \qquad (9)$$

where $\beta 2W$ is an imaging power of the second element of lenses at the wide-angle end ($\beta 2W<0$), e0 is a distance from the apex of one side of the first element of lenses facing toward the subject to a front principal point of the first element, h1 is a level at which extensions of principal rays incident at a half-angle of view come across a frontal principal plane of the first element of lenses at the wide-angle end, which is expressed by an equation of computation in relation with paraxial rays, as follows;

$$h1=e1\times e2\times\tan \alpha W\times(1/e1+1/e2-\phi 2)/((1-e1\times\phi 1)\times(1e2\times\phi 2)-e2\times\phi 1)$$

where e1 is a distance between primary points of the first and second elements of lenses, which is expressed by an equation $$e1=(\phi 1\times\phi 2-\phi 1/\beta 2W)/(\phi 1\times\phi 2),$$

and e2 is a distance between primary points of the second element of lenses and aperture stop, which is expressed by an equation $$e2=(1-hSTP\times FW/fW-\phi 1\times e1)\times\beta 2W/\phi 1$$

where hSTP is an open radius of the aperture stop, $\alpha W$ is a half-angle of view at the wide-angle end, fW is a focal length of the whole system at the wide end, and FW is F-number at the wide end.

* * * * *